United States Patent
Ferricean et al.

(10) Patent No.: US 9,494,678 B2
(45) Date of Patent: Nov. 15, 2016

(54) METHOD FOR OPERATING A DISTANCE SENSOR AND DEVICE FOR PERFORMING THE METHOD

(75) Inventors: Sorin Ferricean, Leonberg (DE); Martin Osterfeld, Schlaitdorf (DE)

(73) Assignee: Balluff GmbH, Neuhausen/Filder (DE)

( * ) Notice: Subject to any disclaimer, the term of this patent is extended or adjusted under 35 U.S.C. 154(b) by 421 days.

(21) Appl. No.: 14/112,586

(22) PCT Filed: Apr. 19, 2011

(86) PCT No.: PCT/DE2011/000430
§ 371 (c)(1),
(2), (4) Date: Dec. 27, 2013

(87) PCT Pub. No.: WO2012/142985
PCT Pub. Date: Oct. 26, 2012

(65) Prior Publication Data
US 2015/0048969 A1   Feb. 19, 2015

(51) Int. Cl.
*G01S 13/34* (2006.01)
*G01S 13/32* (2006.01)
*G01S 7/40* (2006.01)

(52) U.S. Cl.
CPC .............. *G01S 13/32* (2013.01); *G01S 7/4008* (2013.01); *G01S 7/4021* (2013.01)

(58) Field of Classification Search
CPC .................... G01S 7/038; G01S 7/4008; G01S 7/4021; G01S 13/34; G01S 13/887;
(Continued)

(56) References Cited

U.S. PATENT DOCUMENTS 4,245,211 A   1/1981 Kao
5,969,667 A   10/1999 Farmer et al.
(Continued)

FOREIGN PATENT DOCUMENTS

DE   20 2010 007 111 U1   8/2010

OTHER PUBLICATIONS

"Elektronik," a trade magazine for industrial users and developers, WEKA Fachmedien GmbH, Gruber Strasse 46a, D-85586 Poing, Special Issue 22 of 29 Oct. 2002, total pages: 6.
(Continued)

*Primary Examiner* — Timothy A Brainard
(74) *Attorney, Agent, or Firm* — Collard & Roe, P.C.

(57) ABSTRACT

The invention relates to a method for operating a distance sensor (10). In the method, a transmission signal (S1) is radiated as transmission radiation (S2), reflected as reflection radiation (S3) by an object (16), the distance (D) of which is to be measured, and received as a reflection signal (S4). The reflection signal (S4) present at a receiver input (28) and a reference signal likewise occurring at the receiver input (28) are controlled to a specified ratio, the distance (D) being determined during the adjusting process. The invention further relates to devices for performing the method. The method is characterized in that microwaves are used as the transmission radiation (S2) and a cross-talk signal (S5, S6) from the transmission signal (S1) directly to the receiver input (28) with suppressed radiation of the transmission signal (S1) is used as the reference signal.

14 Claims, 3 Drawing Sheets

(58) Field of Classification Search
CPC .......... G01S 13/931; G01S 7/03; G01S 7/032; G01S 7/4017; G01S 7/4056; G01S 13/32; G01S 2007/4065; G01S 7/4052; G01B 7/003
USPC .................................. 342/70, 145, 165, 194
See application file for complete search history.

(56) References Cited

U.S. PATENT DOCUMENTS

2010/0052972 A1* 3/2010 Kasano ................. G01S 15/523
 342/28
2013/0204566 A1 8/2013 Sgarz et al.

OTHER PUBLICATIONS

International Preliminary Report on Patentability on PCT/DE2011/000430, Oct. 22, 2013.
International Search Report of PCT/DE2011/000430, mailed Feb. 16, 2012.

* cited by examiner

METHOD FOR OPERATING A DISTANCE SENSOR AND DEVICE FOR PERFORMING THE METHOD

CROSS REFERENCE TO RELATED APPLICATIONS

This application is the National Stage of PCT/DE2011/000430 filed on Apr. 19, 2011, the disclosure of which is incorporated by reference. The international application under PCT article 21(2) was not published in English.

The invention is based on a method for operation of a distance sensor and on a device for performance of the method according to the preamble of the independent claims.

PRIOR ART

An opto-electronic distance sensor principle is described in the trade magazine "Elektronik", a trade magazine for industrial users and developers, WEKA Fachmedien GmbH, Gruber Strasse 46a, D-85586 Poing, Special Issue 22 of 29 Oct. 2002. The optical measurement beam emitted by a transmission LED is incident on an object, the distance of which from the distance sensor is to be measured, is reflected from the object and is received as a reflection beam by a reception photodiode. A compensation beam path, in which an optical beam emitted by a compensation LED is incident directly on the reception photodiode, is present in addition to the measurement beam path.

The optical beam of the two beam sources is rectangular-wave-modulated in each instance, the modulation being shifted 180° out of phase. This means that the two transmission LEDs are alternatingly turned on and off cyclically. A demodulator connected as a synchronous rectifier determines the two signals received by the reception photodiode and makes the difference between the two reception signals available to a regulator, which determines a correcting variable with which the transmission power of the transmission LED and/or of the compensation LED is regulated such that the two reception signals are equally large. In the adjusted condition, the correcting variable is equal to zero. The distance information is obtained by acquisition and assessment of the transient regulation processes.

The arrangement is insensitive to a change of the sensitivity of the reception photodiode, which may vary in dependence on the irradiation intensity, to a drift of the amplification factor of the amplifier and to a change of efficiency of the transmission and compensation LED as well as to a thermal drift of the arrangement.

Also known are microwave radar sensors, which permit a distance or path-length measurement by means of microwaves. The microwaves reflected from an object are received and assessed. Movements of the object are acquired with a CW doppler radar. The distances may also be acquired with a pulse radar or an FMCW arrangement.

To be independent of amplitudes, an FM (frequency modulation) is used in CW (continuous wave) arrangements, wherein a frequency difference, which is assessed for the determination of the difference, occurs between the emitted microwave signal and the received microwave signals because of the transit time. On the basis of legislative regulations for the selection of the frequency range of the microwaves and especially for the permissible bandwidth of the modulation signal, restrictions exist in particular for the modulation frequency, which is permitted to be maximally 250 MHz at a transmission frequency of, for example 24 GHz. Thus the resolvability, meaning the minimal detectable distance between two target objects (targets), lies at 60 cm. Inasmuch as a pulse radar is used, the measurement range is also limited downward with regard to the limitation of the flank slope, because the reception pulse is permitted to be received only when the transmission pulse has ended. Because of the bandwidth limitation, it is not possible to select the pulse durations or the flank slopes to be small enough for small distances below the meter range.

The task underlying the invention is to specify a method for operation of a distance sensor and devices for performance of the method, which with simple means are suitable for short distances even under the meter range and permit a high measurement accuracy independently of the measurement range.

The task is accomplished by the features specified in the respective independent claims.

DISCLOSURE OF THE INVENTION

The method according to the invention for operation of a distance sensor starts from the premise that a transmission signal is emitted as a transmission beam, reflected as a reflection beam from an object, the distance of which is to be measured, and received as a reflection signal. The reflection signal present at a receiver input and a reference signal also arriving at the receiver input are regulated to a predetermined ratio, wherein the distance is determined during the correction process. The method according to the invention provides that microwaves are used as the transmission beam and that the crosstalk signal of the transmission signal is assessed as the reference signal directly at the receiver input while the emission of the transmission signal is suppressed.

The distance sensor according to the invention is independent of a drift of the power of a microwave transmitter used in the distance sensor and of a drift of a necessary microwave receiver, since any drift that may be present acts equally on all signals. The substantial benefit further lies in the fact that an assessment of an absolute reception field strength or of a reception signal amplitude becomes unnecessary with the provided compensation behavior.

A further advantage is derived from the fact that the temperature behavior of the distance sensor according to the invention is enforced or at least influenced by an appropriate design of the attenuation of the crosstalk signal and therefore can be compensated.

A CW microwave transmitter (continuous wave) can be provided with the method according to the invention, and so a very small distance can be measured. By omission of a modulation of the transmission signal, criteria concerning signal bandwidths can be easily met.

The method according to the invention permits short measurement cycles with simultaneously a high dynamic. On the basis of the regulation to a certain ratio, which corresponds to a compensation method, influences that may occur on the signal in the transmission branch and/or reception branch, for example due to the temperature, are compensated and do not affect the measurement result.

The method according to the invention is a purely energetic method, which permits simple signal conditioning and signal assessment. Therefore a complex hardware and software is not required. On the basis of the simple accomplishment, a small energy consumption can be achieved. Furthermore, the method according to the invention can be accomplished inexpensively, for example in the context of a compact miniaturized construction.

Advantageous improvements and configurations of the method according to the invention are subject matters of the dependent method claims.

The devices according to the invention provide either at least one transmission/reception antenna or at least one transmission antenna and at least one reception antenna separate from the transmission antenna. In this way the devices according to the invention for performance of the method permit a flexible adaptation to different geometries.

Exemplary embodiments of the invention are illustrated in the drawing and explained in more detail in the following description.

SHORT DESCRIPTION OF THE FIGURES

FIG. 1 shows a first exemplary embodiment of a distance sensor according to the invention with a transmission/reception antenna, FIG. 2 shows a second exemplary embodiment of a distance sensor according to the invention with a transmission antenna and a reception antenna provided separately from the transmission antenna, and FIGS. 3*a* to 3*g* show signal profiles in dependence on the time t, which occur in a distance sensor according to the invention.

DETAILED DESCRIPTION OF THE EXEMPLARY EMBODIMENTS

FIG. 1 shows a distance sensor 10, in which the transmission signal S1 generated by a microwave oscillator 12 is emitted by a transmission/reception antenna 14 as a transmission beam S2 to an object 16, the distance D of which from the distance sensor 10 is to be measured, is reflected, and the reflection beam S3 reflected from the object 16 is received by the transmission/reception antenna 14.

In the distance sensor 10 according to the invention, the signal attenuations of the transmission beam S2 and of the reflection beam S3 are evaluated on the transit between the transmission/reception antenna 14 and the object 16 for the determination of the distance D or the path length to the object 16. According to FIG. 1, the distance D can be measured starting from the transmission/reception antenna 14.

The microwave oscillator 12 providing the transmission signal S1 is connected to a first port 18 of a circulator 20 and the transmission/reception antenna 14 is connected via a first changeover switch 22 to a second port 24 of the circulator 20. The reflection signal S4 corresponding to the reflection beam S3 travels via the transmission/reception antenna 14, the changeover switch 22 and the second port 24 of the circulator 20 to a third port 26 of the circulator 20.

The circulator 20 is preferably constructed as a passive circulator 20. The circulator 20 separates signal directions. A signal that is injected at an input is passed on to the next port, in each instance. At an open port, the signal is relayed unchanged and at a short-circuited port the sign of the signal voltage is reversed. When the port is closed with like impedance, the signal is not relayed to the next port. The signals are relayed in known manner in the loop.

In the shown exemplary embodiment, the transmission signal S1 present at the first port 18 is passed in the shown position of the first changeover switch 22 to the transmission/reception antenna 14, and subject to the prerequisite of an impedance adaption of like sign of the transmission/reception antenna 14 is emitted completely as a transmission beam S2. The reflection beam S3 reflected from the object 16 is relayed as a reflection signal S4 from the transmission/reception antenna 14 via the first changeover switch 22 and via the second port 24 of the circulator 20 to the third port of the circulator 26. The reflection signal S4 is present at a receiver input 28 of the distance sensor 10, which is connected with the third port 26 of the circulator 20.

An ideal circulator, with exact adaptation to the characteristic impedance, would exhibit an infinitely high crosstalk attenuation between the first port 18 and the third port 26. The real circulator 20, however, has a finite crosstalk attenuation, which is known and, for example, amounts to 20 dB. Because of the finite crosstalk attenuation from the first port 18 to the third port 26, a crosstalk signal S5 occurs, which is shown as a dashed line in FIG. 1. The crosstalk signal S5 arrives without emission directly at the receiver input 28.

According to the invention, the crosstalk signal S5 of the transmission signal S1 directly to the receiver input 28 is used as the reference signal.

According to FIG. 1, the first changeover switch 22 in a first operating phase BP1 of the distance sensor 10 is supposed to be in the shown position, in which the second port 24 of the circulator 20 is connected with the transmission/reception antenna 14. In the first operating phase BP1, therefore, the reflection signal S4 and the crosstalk signal S5 are present simultaneously at the receiver input 28, the amplitude of the reflection signal S4 being considerably higher than that of the crosstalk signal S5, so that the superposition occurring in the first operating phase BP1 of the reflection signal S4 with the crosstalk signal S5 at the receiver input 28 is approximated such that the crosstalk signal S5 is disregarded.

In a second operating phase BP2 of the distance sensor 10, the first changeover switch 22 is in the other position, in which the second port 24 of the circulator 20 is connected with an impedance Z, which is constructed as an ohmic resistance, the value of which corresponds as closely as possible to the characteristic impedance of the arrangement and, for example, amounts to 50 ohm.

In the second operating phase BP2, therefore, the transmission signal S1 is absorbed in the impedance Z and not emitted via the transmission/reception antenna 14. Nevertheless, by virtue of the finite crosstalk attenuation, the attenuated transmission signal S1 is present as the crosstalk signal S5 at the third port 26 of the circulator 20. In the second operating phase BP2, therefore, only the crosstalk signal S5, which according to the invention is evaluated as a reference signal, is present at the receiver input 28.

The reflection signal S4 and the crosstalk signal S5 pass into a receiver 30, which conditions and demodulates the signals S4, S5. At the receiver output 32, a first d.c. voltage US4, which with disregard for the crosstalk signal S5 is a measure of the reflection signal S4, occurs in the first operating phase BP1, and a second d.c. voltage US5, which is a measure of only the reference signal corresponding to the crosstalk signal S5, occurs in the second operating phase BP2.

For conditioning of the reception signals S4, S5, the receiver 30 contains, for example, a mixer for transforming the microwaves, the frequency of which lies, for example, at 24 GHz, into a lower frequency range, which is easier to manipulate by signal technology. This transformation into an intermediate frequency range takes place in known manner by a mixing of the microwaves with an oscillator frequency, which deviates by the amount of the desired intermediate frequency from the frequency of the transmission signal S1.

The output 32 of the receiver 30 is connected in the first operating phase BP1 via a second changeover switch 34 with a first sample and hold circuit 36, and in the second operating phase BP2 with a second sample and hold circuit 38. Accordingly, the first sample and hold circuit 36 stores the first d.c. voltage US4 corresponding to the reflection signal S4 and the second sample and hold circuit 38 stores the d.c. voltage US5 corresponding to the crosstalk signal S5 or respectively the reference signal.

The two d.c. voltages US4, US5 pass into a differential amplifier 40, which makes the difference voltage dV available as the output signal, which is compared in a downstream comparator 42 with a reference voltage Vref. The difference voltage dV depends on the crosstalk attenuation as well as on the attenuation of the transmission beam. S2 or of the reflection beam S3 respectively, the relationship being contained in a logarithmic function.

The output signal of the comparator 42 can be designated as a correcting variable ST, by means of which the power of the transmission signal S1 is influenced, wherein the power may be increased or decreased. The correcting variable ST can fine tune, for example, the amplification factor of an end stage of the microwave transmitter 12 and/or a variable signal attenuation at the output of the microwave transmitter 12. For the regulation fine tuning, it is possible to proceed in such a way as to fine tune the power during the first operating phase BP1 and/or during the second operating phase BP2. In particular, for a fine tuning during the second operating phase BP2, the transmission power can be increased, so that a smaller signal dynamic has to be controlled in the receiver 30.

The objective of the fine tuning with the correcting signal ST is to adjust the ratio between the reflection signal S4 and the crosstalk signal S5 to a predetermined value. The adjustment can take place with the reference signal Vref, which can also be zero, for example, so that the reflection signal S4 and the reference signal S5 are equally large in amplitude in the adjusted condition.

In this way the distance sensor 10 is independent of a drift of the power of a microwave transmitter 12 and of a drift in the microwave receiver 30, since any drift that may be present acts on both signals S4, S5. A substantial benefit further lies in the fact that an assessment of an absolute reception field strength or of a reception signal amplitude becomes unnecessary with the provided compensation behavior. In this way high accuracy can be achieved on the whole.

In CW mode, the microwave transmitter 12 is operated with constant frequency. The achievable minimally measurable distance D is not limited by pulse transit times or limited frequency modulation deviations, and at least theoretically can be as small as distance zero.

The information about the distance D of the object 16 from the transmission/reception antenna 14 is inserted in the difference voltage dV, which occurs transiently during the correction process. The difference voltage dV is made available to a distance determination circuit 44, which determines the distance D from the transiently occurring difference voltage dV. The maximum amplitudes at the beginning of the correction process and/or the reaction time or the signal flanks respectively can be assessed when the distance D of the object 16 changes while approaching or receding. The relationship is preferably determined in a learning process and stored in a memory for the next operation of the distance sensor 10. The distance determination circuit 44 makes the distance D available at an output.

FIG. 2 shows an alternative possibility for realization of the distance sensor 10 according to the invention. The parts shown in FIG. 2 that correspond to those shown in FIG. 1 are respectively denoted with the same reference symbols.

In the exemplary embodiment shown in FIG. 2, the circulator 20 is omitted. A transmission antenna 50 and a reception antenna 52 provided separately from the transmission antenna 50 are present. In this exemplary embodiment also, the transmission beam S2 emitted by the transmission antenna 50 is incident on the object 16, the distance D of which from the distance sensor 10 is to be measured. The reflection beam S3 reflected from the object 16 is received by the reception antenna 52 and arrives at the receiver input 28 as the reflection signal S4.

In this exemplary embodiment also, a crosstalk signal S6 occurs, which can be assessed as a reference signal. The crosstalk signal S6 arrives from the transmission antenna 50 at the reception antenna 52. In FIG. 2, the crosstalk signal S6 is again entered as a dashed line.

The signal processing does not differ from that of the exemplary embodiment with at least one transmission/reception antenna 14 shown in FIG. 1. Whereas the crosstalk attenuation in a circulator 20 amounts, for example, to 20 dB, a higher crosstalk attenuation in the range of, for example, up to 100 dB, must be expected in the exemplary embodiment according to FIG. 2. The crosstalk signal S6 between the transmission antenna 50 and the reception antenna 52 arrives at the receiver input 28 and is transformed by the receiver 30 into a corresponding d.c. voltage US6, which during the second operating phase BP2 is made available via the second changeover switch 34 to the second sample and hold circuit 38 for storage.

FIGS. 3a to 3g show signal profiles in dependence on the time t. FIG. 3a shows the transmission level occurring in the first exemplary embodiment of the distance sensor 10 according to the invention in dBm of the transmission signal S1 during the two operating phases BP1 and BP2. In view of the fact that the crosstalk signal S5 is attenuated more strongly than the reflection signal S4, it is assumed in the shown exemplary embodiment that a smaller transmission level of, for example, 6 dBm is supplied in the first operating phase BP1 and a larger transmission level of, for example, 10 dBm, which from a time T increases to 11 dBm, is supplied in the second operating phase BP2. At the time T, a proximity of the object 16 is assumed, so that a smaller distance D is measured after the time than before the time T.

FIG. 3b shows the signal attenuation D5 of the crosstalk signal S5 and the sum of the signal attenuations D2+D3, to which the transmission beam S2 and the reflection beam S3 are subjected, wherein the signal attenuation D5 of the crosstalk signal S5—as already mentioned—is supposed to be higher, for example at 9 dB, than the sum of the signal attenuations D2+D3 of the beam signals S2, S3, which at first are assumed to be 4 dB and from time T to be 3 dB.

FIG. 3c shows the reception level in dBm of the reception signal S4, which lies at 2 dBm, wherein the reception level of 2 dBm is derived from the 6 dBm transmission level of the transmission signal S1 minus the sum of the signal attenuations D2+D3 of 4 dB of the beam signals S2, S3. From time T on, the signal level of the reception signal S4 increases to 3 dBm because of the proximity of the object 16.

FIG. 3d shows the crosstalk level in dBm of the crosstalk signal S5, which lies at 1 dBm, wherein the crosstalk level of 1 dBm is derived from the 10 dBm transmission level of the transmission signal S1 minus the signal attenuation D5 of 9 dB of the crosstalk signal S5. From time T on, the crosstalk level of the crosstalk signal S5 increases correspondingly to 2 dBm because of the increase of the transmission level by 1 dBm.

As already described, the maximum amplitudes in the correction process and/or the reaction time or the signal flanks can be assessed for determination of the distance D of the object 16.

Figure 1:
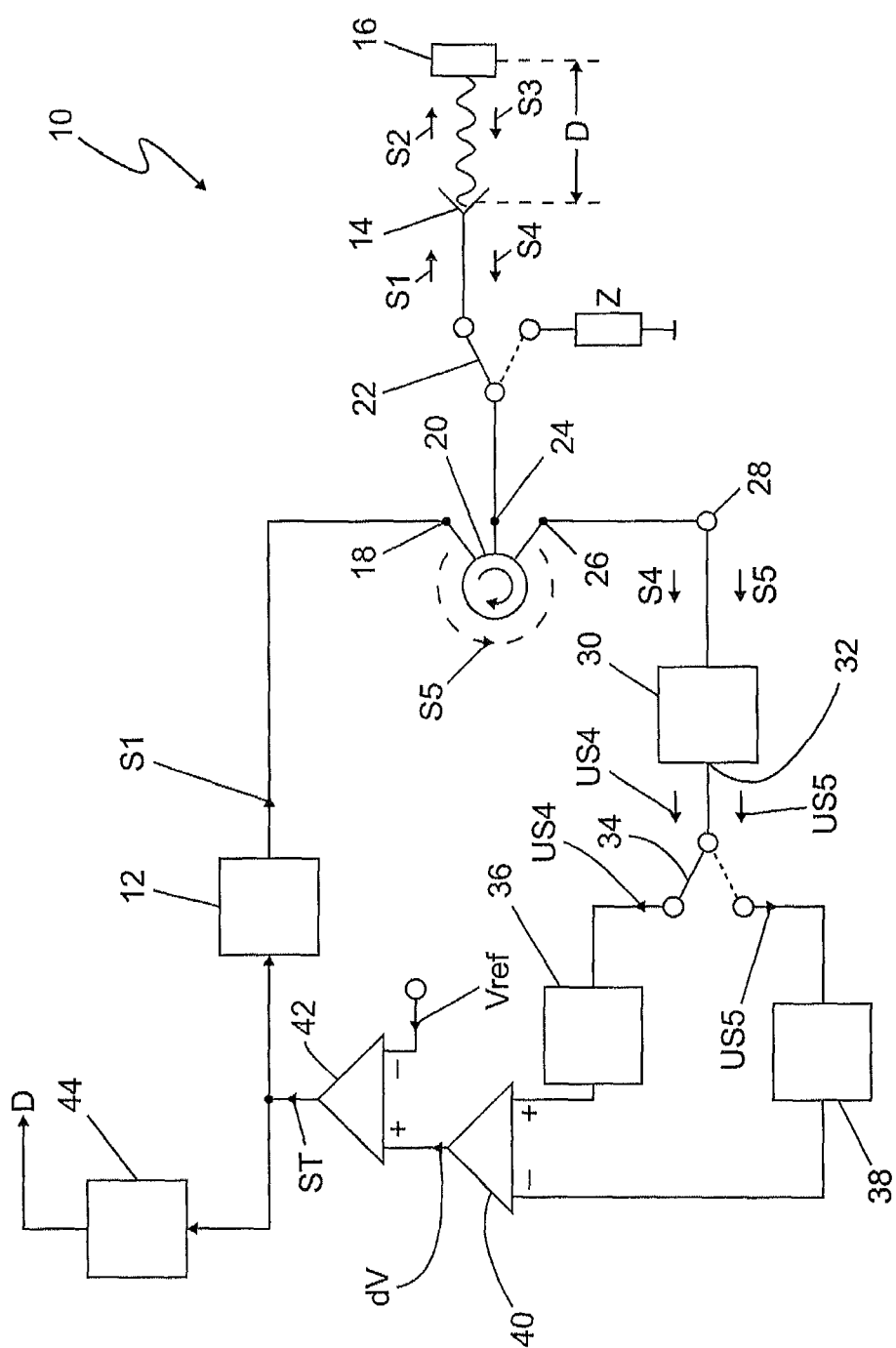
Figure 2:
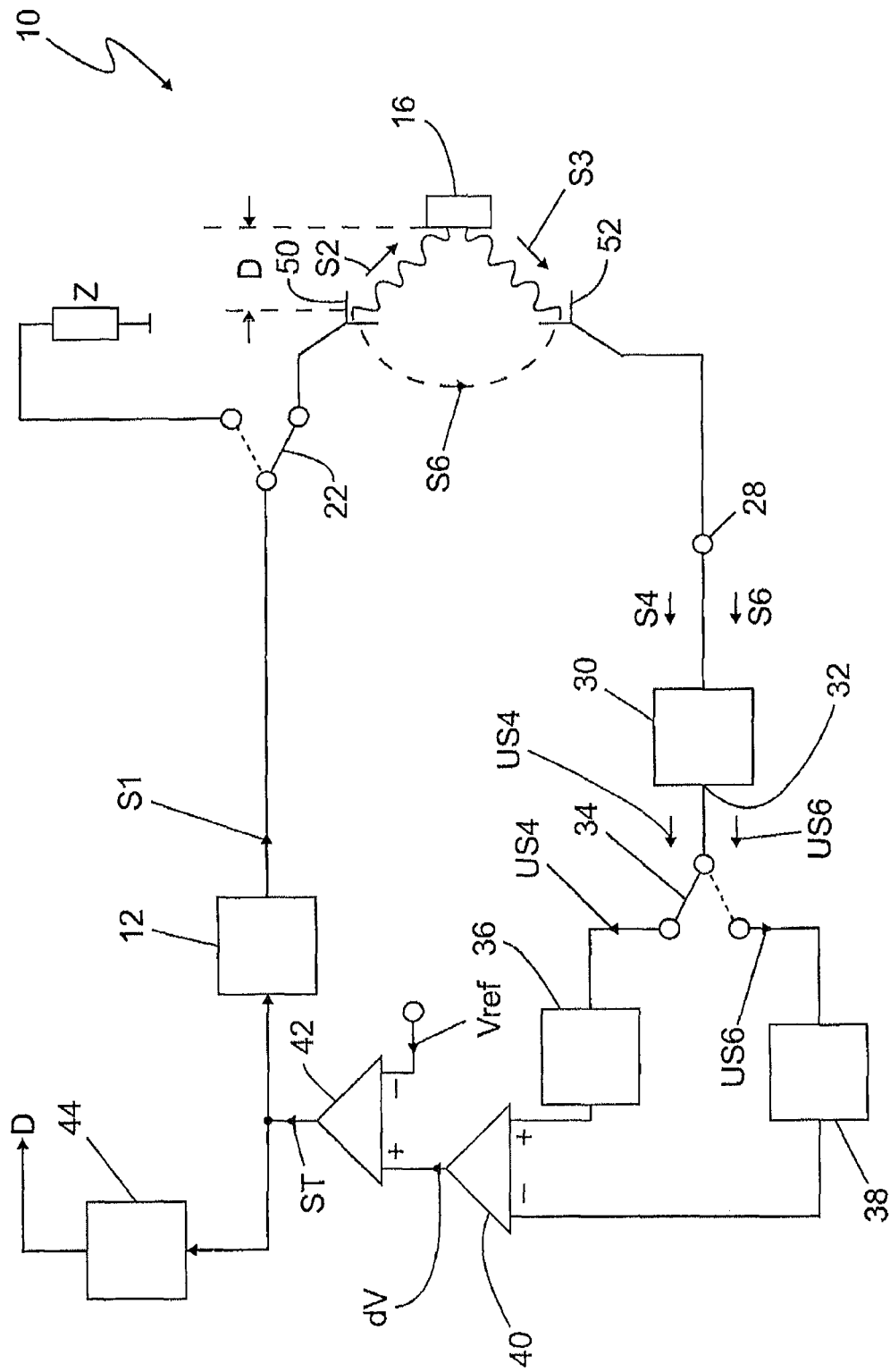
Figure 3A:
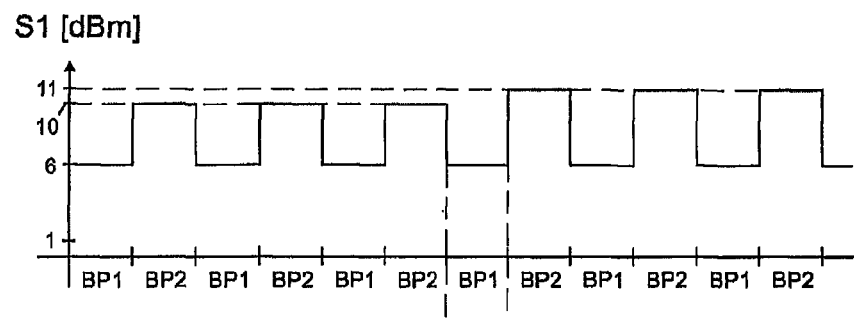
FIG. 3e shows the d.c. voltage US4, which corresponds to the reflection signal S4 and which increases to a higher level at time T because of the proximity of the object 16 and the smaller attenuations D2+D3 of the beam signals S2, S3 caused thereby.
FIG. 3f illustrates the d.c. voltage US5, which corresponds to the crosstalk signal S5 and which also increases after time T because of the correction of the difference voltage dV.
FIG. 3g shows the process of correction of the difference voltage dV, which begins with time T and according to the exemplary embodiment is already supposed to be finished in the following second operating phase BP2.
Figure 3B:
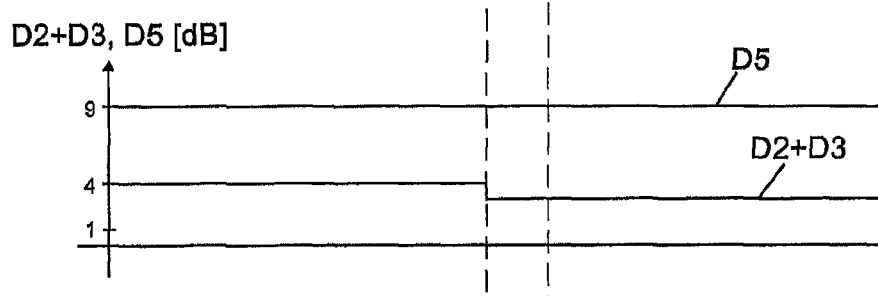
Figure 3C:
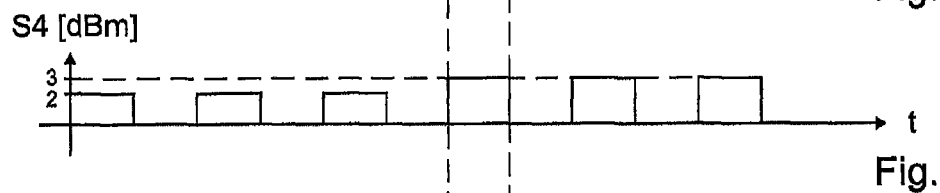
Figure 3D:
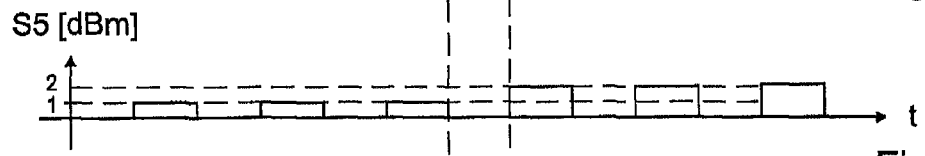
Figure 3E:
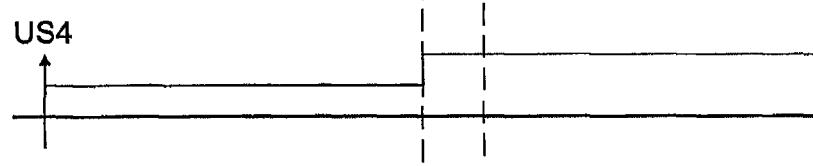
Figure 3F:
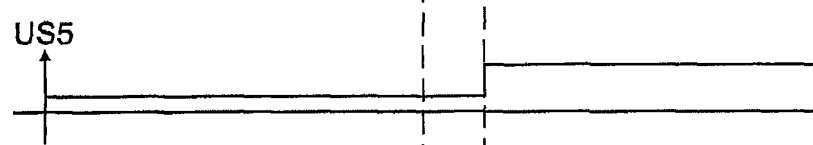
Figure 3G:

The signal profiles shown in the FIGS. 3a to 3g in dependence on time t were based on the first exemplary embodiment of the distance sensor 10 according to the invention, which has a single antenna 14, which is operated as a transmission/reception antenna. The signal attenuation D5 of the crosstalk signal S5 is comparatively smaller than the signal attention D6, not shown in the FIGS. 3a to 3f, that occurs in the exemplary embodiment of the distance sensor 10 according to the invention, which has a transmission antenna 50 and a separate reception antenna 52. In this case the transmission level of the transmission signal S1 during the second operating phase BP2 would have to lie correspondingly higher. Additionally or alternatively, it is possible to regulate to a larger difference voltage dV by a change of the reference voltage Vref.

A numerical example, on the basis of which the relationships are illustrated, is reproduced in the following.

A transmission power Pout of 4 dBm is assumed. Thus a transmission power of 2.5 mW, corresponding to 500 mV at 50 ohm, is obtained.

The air attenuation DL of the transmission beam S2 and of the reflection beam S3 on the path from the transmission/reception antenna 14 or the transmission antenna 50 to the object 16 and from the object back to the transmission/reception antenna 14 or reception antenna 52 can be described by:

$$DL=10 \log(Pout/Pin)=10 \log(1/D^3)$$

where Pin is the input power at the receiver input 28. For a distance D=2 m, the air attenuation DL=−6 dB.

For an assumed attenuation DRK of the crosstalk signal S5 in the circulator 20 of −20 dB, the power Pref of the reference signal S5 amounts to:

$$Pref=Pout-DRK=4 \text{ dBm}-20 \text{ dB}=-16 \text{ dBm}$$

Pref=0.025 mW, corresponding to an input voltage Uref at the receiver input 28 of 50 mV at 50 ohm.

The input power Pin is given by:

$$Pin=Pout-DL=4 \text{ dBm}-6 \text{ dB}=-2 \text{ dBm}$$

Pin=0.63 mW corresponding to an input voltage Uin at the receiver input 28 of 250 mV at 50 ohm.

In the case of a change of the distance D of the object 16, a difference voltage dV occurs:

$$dV=Uin-Uref$$

$$dV=10 SQRT(Pin)-10 SQRT(Pref)$$

$$dV=10[SQRT(Pin)-SQRT(Pref)]$$

$$\log dV=\log 10+\log [SQRT(Pin/Pref)]$$

$$\log dV=\log 10+\log [SQRT(10\exp\{(Pin-Pref)/10\})]$$

$$\log dV=\log 10+\log [SQRT(10\exp\{(Pout-DL-Pout+DRK)/10\})]$$

$$\log dV=\log 10+\log [SQRT(10\exp\{(DRK-DL)/10\})]$$

This means that, for known attenuation of the crosstalk signal S5 in the circulator 20, the difference voltage dV is only a function of the air attenuation DL and thus of the distance D of the object 16.

The invention claimed is:

1. Method for operation of a distance sensor, in which a transmission signal is emitted as a transmission beam from an emitter, reflected as a reflection beam from an object and received as a reflection signal, in which the reflection signal present at a receiver input and a reference signal also arriving at the receiver input are regulated to a predetermined ratio,
   wherein a distance from the object to the emitter is determined during the correction process,
   wherein microwaves are used as the transmission beam and
   wherein a crosstalk signal of the transmission signal is assessed as the reference signal directly at the receiver input while the emission of the transmission signal is suppressed.

2. Method according to claim 1, wherein, in a first operating phase, the transmission signal is emitted as a transmission beam and the reflection beam reflected at the object is received as a reflection signal, and
   wherein, in a second operating phase, the emission of the transmission signal is suppressed and the crosstalk signal is assessed as the reference signal.

3. Method according to claim 2, wherein the reflection signal arriving at the receiver input during the first operating phase and the reference signal present during the second operating phase are stored and the stored signals are set in relationship to one another.

4. Method according to claim 3, wherein the reference is established by the fact that the signal difference being formed, and
   wherein the signal difference is compared with an adjustable reference signal.

5. Method according to claim 4, wherein the amount of the adjustable reference signal is set to zero.

6. Method according to claim 4, wherein the distance of the object is determined from the signal difference during the correction of the power of the transmission signal.

7. Method according to claim 2, wherein the power of the transmission signal supplied in the first operating phase or in the second operating phase is readjusted.

8. Method according to claim 1, wherein the power of the transmission signal is regulated.

9. Method according to claim 1, wherein a CW microwave signal is used as the transmission signal.

10. Device for performance of the method according to claim 1, wherein at least one transmission antenna and at least one reception antenna separate from the transmission antenna are provided,
    wherein the at least one transmission antenna is the emitter, and wherein the crosstalk signal occurs between the at least one transmission antenna and the at least one reception antenna.

11. Device according to claim 10, wherein sample and holding circuits for storage of the received reflection signal and of the crosstalk signal assessed as the reference signal are provided.

12. Device according to claim 10, wherein an impedance having the characteristic impedance is provided,
- wherein, in a first operating phase, the transmission signal is emitted as the transmission beam and the reflection beam reflected at the object is received as the reflection signal,
- wherein, in a second operating phase, the emission of the transmission signal is suppressed and the crosstalk signal is assessed as the reference signal, and
- wherein in the second operating phase and for suppression of the emission of the transmission signal, a microwave transmitter is connected with the impedance instead of with the at least one transmission antenna.

13. Device for performance of the method according to claim 1, wherein at least one transmission/reception antenna is provided that is used simultaneously as the transmission antenna and as the reception antenna,
- wherein the at least one transmission/reception antenna is the emitter,
- wherein a circulator is provided, to which a microwave transmitter is connected at a first port, the at least one transmission/reception antenna is connected at a second port and the receiver input of a receiver is connected at a third port, and
- wherein the crosstalk signal occurs between the first port and the third port of the circulator.

14. Device according to claim 13, wherein an impedance having a characteristic impedance is provided,
- wherein, in a first operating phase, the transmission signal is emitted as the transmission beam and the reflection beam reflected at the object is received as the reflection signal,
- wherein, in a second operating phase, the emission of the transmission signal is suppressed and the crosstalk signal is assessed as the reference signal, and
- wherein in the second operating phase and for suppression of the emission of the transmission signal, the microwave transmitter is connected with the impedance instead of with the at least one transmission/reception antenna.

* * * * *